United States Patent Office 3,560,459
Patented Feb. 2, 1971

3,560,459
CATALYST SYSTEM AND PROCESS FOR PREPARING POLYMERS FROM CATIONICALLY POLYMERIZABLE MONOMERS
Joseph P. Kennedy, Cranford, N.J., assignor to Esso Research and Engineering Company, a corporation of Delaware
No Drawing. Filed Apr. 14, 1969, Ser. No. 816,058
Int. Cl. C08d 1/14, 3/04, 3/06
U.S. Cl. 260—85.3                                    19 Claims

ABSTRACT OF THE DISCLOSURE

A catalyst is prepared by reacting alkyl aluminum dihalide, in the absence of a hydrocarbon solvent, with a cobalt salt to form a blue liquid complex. The catalyst so formed may be used to prepare highly unsaturated polymers and copolymers of cationically polymerizable monomers.

The polymers of this invention are rubbery high molecular weight materials. The preferred monomers are isobutylene and isoprene. The preferred alkyl aluminum halide is aluminum ethyl dihalide and the preferred cobalt salts are $CoCl_2$, cobalt bromide and cobalt acetonyl acetonate.

BACKGROUND OF INVENTION

This invention relates to a catalyst for preparing high molecular weight polymers and copolymers of cationically polymerizable monomers. The copolymers prepared by this process have higher unsaturation than conventional butyl rubber copolymers.

It is well known to the art that anionic coordinated catalyst systems may be prepared by reacting aluminum ethyl dichloride ($AlEtCl_2$) with cobalt chloride in a hydrocarbon solvent. This catalyst system is useful in the preparation of cis-1,4-polybutadiene. (See for example U.S. Pat. 3,135,725 and British Pat. 827,365, incorporated herein by reference.)

These patents disclose preparation of cis-1,4-polybutadiene using catalysts prepared by dispersing anhydrous cobalt chloride in a hydrocarbon solvent such as toluene or xylene, reacting it with trialkyl aluminum, separating the dark inactive precipitate so formed and using the clear liquid obtained as an active catalyst containing about two moles of chlorine for every mole of aluminum.

Modifications of this polymer system wherein a soluble organosilicon compound containing silicon-oxygen bonds have been prepared (see U.S. Pat. 2,977,349). In all the aforementioned disclosures the product is substantially cis-1,4-polybutadiene and the polymers are prepared in the hydrocarbon solvent. It has been found that using these systems, it is not possible to form copolymers of isoolefins with conjugated multiolefins in the hydrocarbon solvents.

SUMMARY OF INVENTION

It has surprisingly been found that a catalyst complex of an aluminum alkyl dihalide and cobalt chloride may be prepared in the absence of solvent to give a blue liquid catalyst complex which is suitable for preparing trans-1,4-polybutadiene and copolymers of isoolefins with conjugated multiolefins.

It is preferred in the preparation of the catalyst that no solvent be used. Polymerization of the monomers is carried out in a polar organic solvent. The catalyst complex may be dissolved in such a polar solvent prior to use.

DETAILED DESCRIPTION OF THE INVENTION

This invention relates to a catalyst complex prepared by reacting an alkyl aluminum dihalide with a cobalt salt, e.g. cobalt chloride, in the absence of solvent to form a blue cobalt complex. This catalyst is suitable for the preparation of trans-1,4-polybutadiene and copolymers of isoolefins with multiolefins.

In the practice of this invention any alkyl aluminum dihalide may be used in the preparation of the cobalt complex. These aluminum compounds have the general formula:

$$AlRX_2$$

wherein X is halogen, and R is $C_1$ to $C_{12}$ alkyl, phenyl, $C_7$ to $C_{30}$ alkylaryl or $C_7$ to $C_{30}$ aralkyl.

Illustrative of the alkyl aluminum dihalides which may be used are aluminum ethyl dichloride, aluminum ethyl dibromide, aluminum butyl dichloride, aluminum phenyl dibromide, aluminum phenyl dichloride, and aluminum phenyl diiodide.

Of the salts suitable for use in the preparation of the cobalt complexes of this invention, cobalt chloride is preferred. Various other cobalt salts may be used. For example, such cobalt salts as cobalt bromide, cobalt-acetonyl acetonate, cobalt acetate, etc., may be used.

In the preparation of the catalyst complex of this invention about .01 to about 1 mole of anhydrous cobalt chloride is reacted in the absence of hydrocarbon solvent with about 1 to about 10 moles of aluminum alkyl dihalide at a temperature of about 50 to 100° C.; preferably about 60–90° C.; more preferably about 70–85° C.; most preferably about 75 to about 80° C. for a period of about 30 minutes to about 24 hours, preferably about 45 minutes to about 18 hours, more preferably about 1 to about 3 hours. A dark blue solution is obtained. The system is cooled at room temperature and the excess undissolved cobalt chloride is filtered off. The complex so formed will have a cobalt to aluminum mole ratio of about 0.01 to about 0.5; more preferably about 0.03 to about 0.25; most preferably 0.05 to about 0.1; e.g. 0.08.

In the preparation of the polymers of this invention, any cationically polymerizable multiolefin may be homopolymerized or copolymerized with a cationically polymerizable isoolefin. Illustrative of the multiolefins which may be used in the practice of this invention are isoprene, butadiene, 2,3-dimethyl butadiene, chloroprene, piperylene, 2,5-dimethylhexadi-2,4-ene, cyclopentadiene, cyclohexadiene, and methylcyclopentadiene. Illustrative of the isoolefins which may be used in the practice of this invention are isobutylene, 2-methyl-1-butene, 3-methyl-1-butene, 4-methyl-1-pentene and β-pinene.

Polymerization may be carried out at a temperature of about —20 to about —120; more preferably about —70 to about —110; most preferably about —90 to about —110° C.

It is essential in the practice of this invention that the polymerization of the polymers and copolymers be carried out in a polar organic solvent. The term "polar organic solvent" as used in the specification and claims means organic solvents having a dielectric constant of about 3 to about 50; preferably about 6 to about 20; more preferably about 8 to about 15; most preferably about 9 to about 12. Illustrative of these polar organic solvents are methyl chloride, ethyl chloride, propyl chloride, chlorobenzene, ortho chlorotoluene, etc. Generally any halogenated organic compound which is normally liquid under polymerization conditions may be used.

Although the process may be carried out with blends with the aforementioned polar solvents in conjunction with nonpolar hydrocarbon solvents, it is preferred that the process be carried out in the absence of nonpolar hydrocarbon solvents. Where such nonpolar hydrocarbon solvents are used in conjunction with the polar organic solvents of this invention, the solvent blend should contain no more than 50 volume percent of nonpolar hydrocarbon solvent; preferably about 10 to about 25 volume percent; most preferably about 0 to about 20 volume percent. Illustrative of the hydrocarbon solvents which may be used in the practice of this invention in conjunction with the polar organic solvents are pentane, hexane, octane, isopentane, isooctane, carbon disulfide, cyclopentane, cyclohexane, and methylcyclohexane.

This invention has particular application in the production of highly unsaturated gel-free copolymers of isoolefins and multiolefins of the butyl rubber type. Incorporation of the multiolefin into the polymer is in the trans-1,4- position.

The expression "butyl rubber" as employed in the specification and claims is intended to include copolymers made from a polymerization reactant mixture having therein about 70–99.5% by weight of an isoolefin which has about 4–7 carbon atoms and about 30–0.5% by weight of a conjugated multiolefin having about 4–14 carbon atoms. The resulting copolymers contain about 85 to 99.5% of combined isoolefin and 0.5 to 15% of combined multiolefin. The term "butyl rubber" is described in an article by R. M. Thomas et al. in Industrial Engineering and Chemistry, vol. 32, pp. 1283 et seq., October 1940. The preparation of butyl rubber is described in U.S. Pat. 2,356,128, which is incorporated herein by reference.

The process of this invention may be carried out using a monomer feed comprising about 10 to about 90 volume percent isoolefin and about 90 to about 10 volume percent multiolefin. The copolymers of this invention may contain as much as 90 wt. percent multiolefin. Preferably they contain about 10 to about 80 wt. percent multiolefin, the remainder being isoolefin; more preferably, about 15 to about 50 wt. percent.

The use of hydrocarbon solvents is detrimental to the process of this invention in that it results in lower molecular weight products as compared to products prepared in the presence of polar solvents. Additionally, the catalysts of this invention will not copolymerize the isoolefins and multiolefins of this invention in the presence of hydrocarbon solvents. The products so formed are substantially mixtures of homopolymers of the individual isoolefins or multiolefins charged to the reaction vessel. The advantages of the catalyst system of this invention may be more readily appreciated by reference to the examples below.

Example 1

A cobalt complex of tributyl aluminum was prepared in the manner disclosed in U.S. Pat. 3,135,725. Example 1 of said patent was reproduced using isobutylene instead of butadiene.

About 3 g. of anhydrous cobalt chloride were dispersed in 10 ml. of dry toluene and about 0.10 ml. of tributyl aluminum were added at room temperature. Some heat evolution was observed. The mixture was allowed to stand overnight and a dark precipitate was obtained. 35 ml. of toluene and 5 ml. of isobutylene were added to this mixture with stirring at ambient temperature and refluxing to prevent the escape of isobutylene. After six hours of stirring, a 3 ml. aliquot was withdrawn and methanol added. No polymer was formed. Similar sampling after 16 hours also resulted in no polymer formation.

The experiment was repeated using triethyl aluminum instead of tributyl aluminum. Again, no polyisobutylene was obtained. Similarly, when aluminum diethyl chloride was used in place of tributyl aluminum, no polymer was obtained. This example serves to illustrate that the catalyst complex prepared in the manner of U.S. Pat. 3,135,725 does not homopolymerize isobutylene.

Example 2

(A) About 3 g. of cobalt chloride was placed in 10 ml. of methyl chloride at about −78° C. and about 0.1 ml. tributyl aluminum was added to this slurry at −78° C. No change was observed. 5 ml. of isobutylene was introduced. No polymer was obtained after about 24 hours at −78° C.

(B) The same experiment was reproduced using as the monomers 2.5 ml. of isobutylene and 2.5 ml. of butadiene; again no polymer was obtained.

(C) Experiment 2A was reproduced using 5 ml. of butadiene instead of the isobutylene. After 24 hours at −78° C., no polymer was obtained.

Example 3

(A) About 1 g. of cobalt chloride was refluxed with about 10 ml. of aluminum ethyl dichloride at about 75 to 80° C. for about one hour. A dark blue solution was obtained. The system was cooled at room temperature and the excess undissolved cobalt chloride filtered off. The aluminum ethyl dichloride-cobalt chloride complex was found to contain about 0.67 g. of dissolved cobalt chloride, or about 5.35 mole percent cobalt chloride based on the aluminum ethyl dichloride.

(B) A 2 volume percent (ca. 0.09 ml.) solution of the catalyst of Example 3A in methyl chloride was gradually added over a period of ten minutes to a charge of 10 ml. of butadiene in 10 ml. of methyl chloride at −30° C. After 15 minutes, the reaction was quenched with methanol. The polymers so precipitated were dried in vacuo at 50° C. Infrared analysis indicated the predominance of trans-1,4- units with some 1,2- enchainment present. There was no indication of cis-1,4- enchainment.

(C) Example 3B was repeated at −50° C.; again, infrared analysis indicated the predominance of trans-1,4- units and the absence of cis-1,4- enchainment.

(D) Experiment 3C was repeated using isoprene instead of butadiene. A yield of about 15.2% of a low molecular weight product was obtained.

Example 4

To a charge of 200 ml. of butadiene and 400 ml. of methyl chloride at −30° C. was gradually introduced over a period of 70 minutes, 6.6 ml. of an $AlEtCl_2 \cdot CoCl_2$ catalyst complex solution (2% in methyl chloride), said catalyst complex having been prepared in the manner of Example 3A. After about 382 minutes, the reaction was terminated by quenching with cold methanol. Aliquots were withdrawn at 31, 72 and 185 minutes. The results of these tests are shown in Table I below.

TABLE I

| Minutes of reaction | Percent conversion | Molecular weight | $I_2$ number | Mole percent unsaturation | Type of unsaturation by IR |
|---|---|---|---|---|---|
| 31 | 3.5 | 7,419 | | | Trans-1,4 |
| 72 | 6.7 | | | | Trans-1,4 |
| 185 | 10.4 | | | | Trans-1,4 |
| 382 | 11.6 | | 141.5 | 31.13 | Trans-1,4 |

Hence, it is evident that since only trans-1,4 enchainment occurs in the polymerization of butadiene with catalyst of the invention, the cobalt complex formed is not the same cobalt complex of the prior art suitable for preparing cis-1,4- enchainment polymers.

Example 5

Experiments were performed using the catalyst complex of Example 1 and various isobutylene-butadiene monomer feeds. The results are shown in Table II.

TABLE II

| Experiment | Catalyst | Charge[1] | Solvent | Temperature | Type of unsaturation |
|---|---|---|---|---|---|
| A | AlEtCl$_2$ control) | 30 | MeCl | −100 | Mainly trans-1,4, some 1,2 |
| B | AlEtCl$_2$·CoCl$_2$ | 30 | Same | −100 | Do. |
| C | Same as above | 65 | do | −100 | Do. |
| D | do | 90 | do | −100 | Do. |
| E | do | 70 | do | −100 | Do. |
| F | do | 70 | do | −100 | Do. |
| G | do | 70 | do | −100 | Do. |
| H | do | 70 | do | −100 | Do. |

[1] Charge comprises butadiene and isobutylene, the number shown indicating value percent butadiene.

These results indicate that the enchainment is substantially trans-1,4 and hence, the catalyst complex is a cationic catalyst as distinguished from prior art cobalt complexes which are coordination catalysts giving cis-1,4 enchainment.

Example 6

A monomer feed comprising 70 vol. percent butadiene and 30 vol. percent isobutylene was polymerized using the catalyst system of Example 1. The solvents used were pentane and methyl chloride. The results are shown in Table III.

TABLE III

| | Charge | | | | | |
|---|---|---|---|---|---|---|
| | Monomers | | Solvents | | | |
| Experiment | iC$_4$= ml. | C$_4$= ml. | CH$_3$Cl | nC$_5$ | Yield, grams | Molecular Weight × 10$^{-3}$ |
| A | 135 | 315 | 225 | 2,025 | 24.2 | 32.5 |
| B | 135 | 315 | 2,250 | | 29.5 | 318 |

It is evident that the use of nonpolar solvents depresses the molecular weight of the copolymer formed.

Example 7

The catalyst complex of this invention was used to polymerize a monomer charge of 210 ml. butadiene and 90 ml. of isobutylene in 15 ml. of methyl chloride at various temperatures. The catalyst complex (7 ml. of 2 vol. percent solution of AlEtCl$_2$·CoCl$_2$ in methyl chloride) was added continuously over an 80 minute period. The results are shown in Table IV.

TABLE IV

| Temperature, °C. | Yield of polymer, grams | Molecular weight | I$_2$ number | Unsaturation molecular percent |
|---|---|---|---|---|
| −30 | 10.58 | 22,730 | 153.1 | 33.65 |
| −78 | 4.10 | 88,060 | 63.50 | 13.78 |
| −100 | 1.222 | 121,300 | 57.97 | 12.75 |

It is evident that the catalyst complex of this invention may be used to prepare low molecular, high unsaturates or high molecular weight copolymers with extraordinarily high levels of unsaturation, i.e. 12.75 mole percent.

Example 8

A monomer charge of 5 ml. of isobutylene in 15 ml. of methyl chloride was polymerized using the cobalt complex of this invention. The reaction was terminated after 12 minutes by quenching with methanol. The experiment was repeated using AlEtCl$_2$ as the catalyst. The results are shown in Table V.

TABLE V

| | Moles of AlEtCl$_2$ added | Yield, gram | Conversion, percent | Molecular weight | Catalyst efficiency, grams polymer/ mole AlEtCl$_2$ |
|---|---|---|---|---|---|
| Catalyst: | | | | | |
| AlEtCl$_2$ | 6.3×10$^{-6}$ | 0.3643 | 10.4 | 328,000 | 58,000 |
| | 6.3×10$^{-6}$ | 0.3466 | 9.9 | 339,000 | 55,000 |
| AlEtCl$_2$·CoCl$_2$ | 3.4×10$^{-6}$ | 0.5549 | 15.7 | 328,000 | 163,000 |
| | 3.4×10$^{-6}$ | 0.3756 | 10.7 | 802,000 | 110,000 |

It is apparent that the catalyst complex of this invention results in much higher catalyst efficiency than conventional catalysts.

Example 9

In the preparation of highly unsaturated copolymers, gel formation often occurs. In order to evaluate the catalyst of this invention from the standpoint of gel formation, a charge comprising 16 ml. of isobutylene and 184 ml. of butadiene in 800 ml. of methyl chloride solvent was polymerized at −100° C. The results are shown in Table VI.

TABLE VI

| | Yield, grams | Molecular weight | I$_2$ number | Unsaturation, mole percent | Gel content, percent |
|---|---|---|---|---|---|
| Catalyst: | | | | | |
| AlEtCl$_2$ | 32.2 | 14,620 | 141.6 | 31.15 | 17.2 |
| AlEtCl$_2$·CoCl$_2$ | 16.9 | 29,280 | 239.8 | 52.76 | 4.1 |

It is evident that the catalyst complex of this invention produces polymers having a higher molecular weight, higher mole percent unsaturation and a substantially lower gel content than conventional catalysts.

Example 10

Example 9 was repeated using a monomer charge comprising 70 vol. percent butadiene and 30 vol. percent isobutylene in methyl chloride. As shown in Table VII, the catalyst complex of this invention produces polymers of higher molecular weight and higher unsaturation than conventional catalysts. Similar results were obtained using isoprene as the conjugated multiolefin.

The monomer charge comprised 97 ml. isobutylene and 3 ml. of isoprene in 400 ml. of methyl chloride. The reaction was carried out at −100° C.

TABLE VII

| Catalyst | Charge | | | Time, minutes | Yield, grams | Molecular weight ×10⁻³ | I₂ number |
|---|---|---|---|---|---|---|---|
| | ml. iC₄⁼ | ml. C₄⁼⁼ | ml. CH₃Cl | | | | |
| Experiment number: | | | | | | | |
| A .......... AlEtCl₂·CoCl₂ .... | 135 | 315 | 2,250 | 76 | 29.5 | 318 | ¹46.0 |
| B .......... Same as above .... | 135 | 315 | 2,250 | 130 | 37.3 | 288 | 52.9 |
| C .......... AlEtCl₂ (control) _ | 135 | 315 | 2,250 | 103 | 11.0 | 179 | 36.8 |

¹ Infrared investigation showed predominantly trans-1,4 butadiene units, some 1,2 units and no cis-1,4 units.

Example 11

Cobalt complexes of various cobalt salts were prepared and used in the polymerization of isobutylene-isoprene copolymer.

Catalyst preparation:

The results shown in Table VIII show that the $CoCl_2$ complex produces polymers having higher unsaturation while $CoBr_2$ and Co(acetonyl acetonate)₂ result in polymers of substantialy higher molecular weight and improved physical properties.

TABLE VIII

| Catalyst: | Yield, grams | Molecular weight, ×10⁻³ | I₂ number | Unsaturation mole percent | Cure ¹ time, minutes | Modulus, 300% p.s.i. | Tensile, p.s.i. | Elongation, percent |
|---|---|---|---|---|---|---|---|---|
| AlEtCl₂ .................... | 31.4 | 440 | 9.72 | 1.43 | 20 | 714 | 3,010 | 687 |
| | | | | | 40 | 698 | 2,764 | 660 |
| | | | | | 60 | 499 | 2,876 | 707 |
| AlEtCl₂·CoCl₂ ........... | 30.6 | 390 | 11.6 | 1.71 | 20 | 742 | 2,791 | 660 |
| | | | | | 40 | 802 | 2,667 | 613 |
| | | | | | 60 | 539 | 2,698 | 720 |
| AlEtCl₂·CoBr₂ ........... | 15.8 | 656 | 8.84 | 1.30 | 20 | 473 | 3,097 | 720 |
| | | | | | 40 | 492 | 3,139 | 740 |
| | | | | | 60 | 317 | 2,922 | 787 |
| AlEtCl₂·Co(acac)₂ ....... | 12.5 | 918 | 7.66 | 1.13 | 20 | 458 | 3,383 | 767 |
| | | | | | 40 | 533 | 3,685 | 727 |
| | | | | | 60 | 341 | 3,325 | 800 |

¹ Cure recipe (in parts) polymer 15, stearic acid 0.15, PBN (phenyl-beta naphthylamine) 0.15, ZnO 0.15, HAF black 7.5, Necton-60 (a naphthenic process oil) 1.5, Tuads (tetramethyl thiuram disulfide) 0.15, Altax (benzothiazyl disulfide) 0.15, sulfur 0.6. Cured at 307° F.

(A) AlEtCl₂·CoCl₂: 1 g. of anhydrous CoCl₂ was heated to 80° C. while stirring in 10 ml. AlEtCl₂. The undissolved CoCl₂ was filtered, washed with pentane and weighed; 0.64 g. CoCl₂ (or 0.00493 mole) dissolved. The Co/Al ratio of this solution is 0.051. It was diluted with methyl chloride to give a 2 wt. percent solution.

(B) AlEtCl₂·CoBr₂: 1 g. of anhydrous CoBr₂ slurried in 10 ml. neat AlEtCl₂ was heated to 80° C. for 2 hours and filtered to remove the undissolved CoBr₂. The filtrate was washed and weighed. The solution contained 0.434 g. (or 0.002 mole) CoBr₂, i.e., the Co/Al ratio was 0.0208. This solution was diluted with methyl chloride to give a 2 wt. percent solution.

(C) AlEtCl₂·Co(acetonyl acetonate)₂: 1 g. of well dried Co(acac)₂ was placed into 10 ml. neat AlEtCl₂ and heated to 80° for 2 hours. A green-black solution was obtained. The undissolved residue was removed by filtration, washed with methyl chloride and weighed; 0.143 g. (or 0.0033 mole) of Co(acac)₂ dissolved which gives a Co/Al ratio of 0.034. This solution was diluted with methyl chloride to give a 2% solution.

Example 12

Example 11 was repeated using a monomer charge comprising 80 ml. of isobutylene and 20 ml. of butadiene in 400 ml. methyl chloride. As shown in Table IX, the catalyst complexes of this invention result in polymers having substantially higher unsaturation than those produced with conventional catalysts.

TABLE IX

| Catalyst: | Yield, grams | Molecular weight, ×10⁻³ | I₂ number | Unsaturation mole percent | Cure ¹ time, minutes | Modulus, 300% p.s.i. | Tensile, p.s.i. | Elongation, percent |
|---|---|---|---|---|---|---|---|---|
| AlEtCl₂ .................... | 34 | 640 | 4.3 | 0.9 | 20 | 560 | 3,043 | 740 |
| | | | | | 40 | 565 | 3,040 | 740 |
| | | | | | 60 | 489 | 3,062 | 753 |
| AlEtCl₂·CoCl₂ ........... | 41 | 435 | 8.21 | 1.8 | 20 | 897 | 3,667 | 707 |
| | | | | | 40 | 884 | 3,037 | 673 |
| | | | | | 60 | 661 | 2,559 | 673 |
| AlEtCl₂·CoBr₂ ........... | 27.6 | 253 | 11.2 | 2.4 | 20 | 819 | 2,187 | 620 |
| | | | | | 40 | 759 | 2,040 | 613 |
| | | | | | 60 | 602 | 1,624 | 607 |
| AlEtCl₂·Co(acac)₂ ....... | 25 | 340 | 8.8 | 2.0 | 20 | 766 | 3,022 | 693 |
| | | | | | 40 | 660 | 2,661 | 700 |
| | | | | | 60 | 529 | 1,811 | 673 |

¹ Cure recipe same as in Example 11.

Although preparation of the catalyst of this invention has been described in terms of refluxing the constituents, it is obvious to those skilled in the art that alternately the reaction of the alkyl aluminum dihalide and cobalt salt may be carried out under pressure without refluxing. The only requirements necessary in carrying out this invention are that the catalyst be prepared by reacting the alkyl aluminum dihalide and cobalt salt (1) in the absence of hydrocarbon solvent, (2) at a temperature above 50° C., but below the decomposition temperature of the reactants. The polar solvents of this invention may be used in preparation of the catalyst. It is preferred, however, that the catalyst be prepared in the absence of solvent.

The pressure at which the reaction is carried out is not critical so long as the temperature requirements are met. Superatmospheric pressures may be used. Where it is desired not to reflux, the pressures must be such that the alkyl aluminum dihalide remains substantially in the liquid form. Illustrative of suitable pressures are about 1 atm. to 10,000 atm.; preferably about 1 atm. to about 1,000 atm.; more preferably about 1 atm. to 500 atm.; most preferably about 1 to about 50 atm.

Though the upper temperature limitation is the decomposition temperature of the alkyl aluminum dihalide, it is preferred that the reaction be carried out at about 50° C. to about 350° C.; more preferably about 60° C. to about 250° C.; most preferably about 70° C. to about 200° C. Where refluxing is used the ideal temperature range is about 50° C. to about 100° C. The minimum temperature of about 50° C. applies whether or not refluxing is used. Preferably, the minimum reaction temperature is about 60° C.; more preferably about 70° C. The reaction is carried out over a period of 30 minutes to about 24 hours; preferably about 45 minutes to about 18 hours; more preferably about 1 to about 3 hours.

What is claimed is:

1. A process for preparing a catalyst useful in the copolymerization of isoolefins and multiolefins which comprises:
   (a) refluxing a cobalt salt selected from the group consisting of cobalt chloride, cobalt bromide, cobalt acetonyl acetonate, cobalt acetate and mixtures thereof with an alkyl aluminum dihalide having the general formula:

$AlRX_2$ wherein R is a hydrocarbon radical selected from the group consisting of $C_1$ to $C_{12}$ alkyl, phenyl, $C_7$ to $C_{30}$ aralkyl and $C_7$ to $C_{30}$ alkylaryl; at a temperature of about 50 to about 100° C. and X is halogen;
   (b) cooling the mixture; and
   (c) separating the liquid portion of the reaction from the unreacted cobalt salt.

2. The process of claim 1 wherein the alkyl aluminum dihalide is aluminum ethyl dichloride and the cobalt salt is $CoCl_2$.

3. The product of claim 1.

4. A process for preparing a copolymer of an isoolefin and a conjugated multiolefin which comprises:
   (a) preparing a catalyst complex by
      (1) refluxing a cobalt salt selected from the group consisting of cobalt chloride, cobalt bromide, cobalt acetonyl acetonate, cobalt acetate and mixtures thereof with an alkyl aluminum dihalide having the general formula:

$AlRX_2$ wherein R is a hydrocarbon radical selected from the group consisting of $C_1$ to $C_{12}$ alkyl, phenyl, $C_7$ to $C_{30}$ aralkyl, and $C_7$ to $C_{30}$ alkylaryl and X is halogen; at a temperature of about 50 to about 100° C.;
      (2) cooling the mixture, and
      (3) separating the liquid portion of the reaction from the unreacted cobalt salt;
   (b) dissolving said catalyst complex in a polar organic solvent; and
   (c) adding a catalytic amount of said catalyst solution to a solution of at least one isoolefin and at least one conjugated multiolefin in a polar organic solvent at a temperature of about −20° C. to about −120° C.

5. The process of claim 4 wherein the isoolefin is isobutylene and the multiolefin is isoprene.

6. The process of claim 4 wherein the monomer feed comprises about 10 to about 90 volume percent of multiolefin.

7. In a process for preparing butyl rubber, the improvement which comprises using as the catalyst a cobalt complex prepared by:
   (a) refluxing a cobalt salt selected from the group consisting of cobalt chloride, cobalt bromide cobalt acetonyl acetonate, cobalt acetate and mixtures thereof with an alkyl aluminum dihalide having the general formula:

$AlRX_2$ wherein R is a hydrocarbon radical selected from the group consisting of $C_1$ to $C_{12}$ alkyl, phenyl, $C_7$ to $C_{30}$ aralkyl and $C_7$ to $C_{30}$ alkylaryl and X is halogen; at a temperature of about 50 to about 100° C. for at least one hour;
   (b) cooling the mixture;
   (c) separating the liquid portion of the reaction from the unreacted cobalt salt; and
   (d) dissolving the complex so formed in an organic polar solvent.

8. The process of claim 7 wherein the isoolefin is isobutylene and the multiolefin is isoprene.

9. A process for preparing a polymer of a conjugated multiolefin which comprises:
   (a) preparing a catalyst complex by
      (1) refluxing a cobalt salt selected from the group consisting of cobalt chloride, cobalt bromide, cobalt acetonyl acetonate, cobalt acetate and mixtures thereof with an alkyl aluminum dihalide having the general formula:

$AlRX_2$ wherein R is a hydrocarbon radical selected from the group consisting of $C_1$ to $C_{12}$ alkyl, phenyl, $C_7$ to $C_{30}$ aralkyl, and $C_7$ to $C_{30}$ alkylaryl and X is halogen; at a temperature of about 50 to about 100° C.;
      (2) cooling the mixture, and
      (3) separating the liquid portion of the reaction from the unreacted cobalt salt;
   (b) dissolving said catalyst complex in a polar organic solvent; and
   (c) adding a catalytic amount of said catalyst solution to a solution of at least one conjugated multiolefin in a polar organic solvent at a temperature of about −20° C. to about −120° C.

10. The process of claim 9 wherein the multiolefin is butadiene, chloroprene, isoprene, or mixtures thereof.

11. The process of claim 4 wherein the solvent comprises a polar organic solvent and a minor amount of a nonpolar hydrocarbon solvent.

12. The process of claim 9 wherein the solvent comprises a polar organic solvent and a minor amount of a nonpolar hydrocarbon solvent.

13. A process for preparing a catalyst useful in the copolymerization of isoolefins and multiolefins which comprises:
   (a) reacting a cobalt salt selected from the group consisting of cobalt chloride, cobalt bromide, cobalt acetonyl acetonate, cobalt acetate and mixtures thereof with an alkyl aluminum dihalide having the general formula: $AlRX_2$ wherein R is a hydrocarbon radical selected from the group consisting of $C_1$ to $C_{12}$ alkyl, phenyl, $C_7$ to $C_{30}$ aralkyl and $C_7$ to $C_{30}$ alkylaryl and X is halogen; at a temperature of at least 50° C.;
   (b) cooling the mixture; and
   (c) separating the liquid portion of the reaction from the unreacted cobalt salt.

14. The process of claim 13 wherein the alkyl aluminum dihalide is aluminum ethyl dichloride and the cobalt salt is $CoCl_2$.

15. A process for preparing a copolymer of an isoolefin and a conjugated multiolefin which comprises reacting at least one isoolefin and at least one conjugated multiolefin in a polar solvent at a temperature of about −20° C. to about −120° C. in the presence of a catalytic amount of the catalyst of claim 3.

16. The process of claim 15 wherein the isoolefin is isobutylene and the multiolefin is isoprene.

17. In a process for preparing butyl rubber, the improvement which comprises using as the catalyst the catalyst of claim 3.

18. The process of claim 17 wherein the isoolefin is isobutylene and the multiolefin is isoprene.

19. A process for preparing a polymer of a conjugated multiolefin which comprises polymerizing said multiolefin using as the polymerization initiator the catalyst of claim 3.

References Cited

UNITED STATES PATENTS 3,135,725  6/1964  Carlson et al. _____ 260—94.3

JOSEPH L. SCHOFER, Primary Examiner

R. A. GAITHER, Assistant Examiner

U.S. Cl. X.R.

252—429, 431; 260—94.3, 87.5